US007526683B1

(12) United States Patent
Votta, Jr. et al.

(10) Patent No.: US 7,526,683 B1
(45) Date of Patent: Apr. 28, 2009

(54) DYNAMIC SELF-TUNING SOFT-ERROR-RATE-DISCRIMINATION FOR ENHANCED AVAILABILITY OF ENTERPRISE COMPUTING SYSTEMS

(75) Inventors: Lawrence G. Votta, Jr., Menlo Park, CA (US); Kenneth C. Gross, San Diego, CA (US); Aleksey M. Urmanov, San Diego, CA (US); Douglas B. Meyer, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 515 days.

(21) Appl. No.: 11/141,844

(22) Filed: Jun. 1, 2005

(51) Int. Cl.
*G06F 11/00* (2006.01)
(52) U.S. Cl. .................... 714/42; 714/718; 714/719; 714/723
(58) Field of Classification Search .................. 714/42
See application file for complete search history.

(56) References Cited

U.S. PATENT DOCUMENTS

| | | | | |
|---|---|---|---|---|
| 5,565,799 | A * | 10/1996 | Houston | 327/52 |
| 5,850,145 | A * | 12/1998 | Burroughs et al. | 324/751 |
| 5,929,645 | A * | 7/1999 | Aton | 324/751 |
| 6,553,536 | B1 * | 4/2003 | Hassner et al. | 714/780 |
| 6,711,712 | B2 * | 3/2004 | Quach | 714/819 |
| 6,986,078 | B2 * | 1/2006 | Rodbell et al. | 714/10 |
| 7,106,642 | B2 * | 9/2006 | Hojo | 365/200 |
| 7,203,881 | B1 * | 4/2007 | Williams et al. | 714/741 |
| 7,328,376 | B2 * | 2/2008 | McGuire et al. | 714/48 |
| 7,447,957 | B1 * | 11/2008 | Cooley et al. | 714/723 |
| 2004/0030956 | A1 * | 2/2004 | Rodbell et al. | 714/26 |
| 2005/0060546 | A1 * | 3/2005 | Parry et al. | 713/171 |
| 2005/0102567 | A1 * | 5/2005 | McGuire et al. | 714/25 |
| 2006/0000981 | A1 * | 1/2006 | Hannah | 250/370.14 |
| 2006/0010346 | A1 * | 1/2006 | Minemier | 714/30 |
| 2006/0107247 | A1 * | 5/2006 | Andreev et al. | 716/11 |

OTHER PUBLICATIONS

Flament, O., Baggio, J. D'Hose, C., Gasiot, G., Leray, J.L., 14 MeV Neutron-Induced SEU In SRAM Devices, IEEE Transactions On Nuclear Science, vol. 51, No. 5, Oct. 2004, pp. 2908-2911.
http://crO.izmiran.rssi.ru/mosc/main.htm, Moscow Neutron Monitor, Cosmic Ray Data sample images.

* cited by examiner

*Primary Examiner*—Scott T. Baderman
*Assistant Examiner*—Loan Truong
(74) *Attorney, Agent, or Firm*—Peter J. Meza; Bobby B. Soltani; Marsh Fischmann & Breyfogle LLP

(57) ABSTRACT

A method for use in a computer system provides a dynamic, "self tuning" soft-error-rate-discrimination (SERD) method and apparatus. Specially designed SRAMs or other circuits are "tuned" in a manner that gives them extreme susceptibility to cosmic neutron events (soft errors), higher than that of the "regular" SRAM components, memory modules or other components in the computer system. One such specially designed SRAM is deployed per server. An interface algorithm continuously sends read/write traffic to the special SRAM to infer the soft error rate (SER), which is directly proportional to cosmic neutron flux. The inferred cosmic neutron flux rate is employed in a Poisson SPRT algorithmic approach that dynamically compensates the soft error discrimination sensitivity in accordance with the instantaneous neutron flux for all of the regular SRAM components in the server.

20 Claims, 4 Drawing Sheets

| SRAM DESCRIPTION | SRAM A | SRAM B | SRAM C | SRAM D | SRAM E | SRAM F | SRAM G |
|---|---|---|---|---|---|---|---|
| $V_{DD}$ (V) | 2.5/3.3 | 2.5 | 3.3 | 3.3 | 5 | 5 | 5 |
| DEVICE CAPACITY | 4 Mbit | 2 Mbit | 4 Mbit | 1 Mbit | 1 Mbit | 1 Mbit | 256 Kbit |
| TECHNOLOGY NODE (μm) | 0.18 | 0.25 | 0.25 | 0.35 | 0.5 | 0.5 | 0.8 |
| MEMORY TYPE | C | C | H | H | C | H | H |
| SENSITIVE VOLUME (μm³) | 0.19 | 0.35 | 0.35 | 0.7 | 1.4 | 1.4 | 6 |

DYNAMIC SELF-TUNING SOFT-ERROR-RATE-DISCRIMINATION FOR ENHANCED AVAILABILITY OF ENTERPRISE COMPUTING SYSTEMS

BACKGROUND OF THE INVENTION

The present invention relates to a method for enhanced discrimination between normal soft errors that arise from cosmic neutron events, and the incipience or onset of mechanisms that lead to hard faults, in a computer system.

The present approach for discriminating between normal soft errors and the onset of mechanisms leading to hard faults is to use an "N over T" or "(N/T)" threshold, which is also called the "leaky bucket" algorithm. If there are N error events within a specified time interval T associated with a computer system component such as a memory, then the memory is declared faulty and replaced. Typical values of N/T range from three CE ("Correctable Errors") events in 24 hours to 24 CE events in 24 hours. The shortcoming of the conventional N/T approach is that cosmic events are not stationary with time. In fact, there can be significant peaks and dips in cosmic activity. There is also a significant variation in cosmic flux for data centers at various altitudes.

The prior art, conventional approach is therefore to set a fixed "N/T" threshold so that if N correctable error events appear in the specified time interval T, the memory in the computing system is replaced. This can increase occurrences of memory NTFs ("No Trouble Found"), which are costly in terms of the hardware exchanged, serviceability costs, and customer dissatisfaction. It is important to note that when memory is replaced due to normal cosmic neutron events, the new memory module is just as likely to exhibit elevated numbers of CEs as the replaced modules.

It is well known that cosmic ray neutrons cause transient errors (also called "soft errors") in computer IC logic and memory chips. Changes in soft error rates (SER) can signify the incipience or onset of problems that lead to hard faults. An algorithm to monitor soft errors and decide if the SER is increasing can be used to predict the incipience of hard failures, thereby helping to improve the reliability, availability, and serviceability (RAS) of computers and computer systems. However, a soft error rate discrimination (SERD) algorithm that gives too many false alarms can create customer dissatisfaction that leads to excessive "No-Trouble-Found" (NTF) events, as explained above.

One prior art method to improve upon algorithms currently used for SERD is by means of a Sequential Probability Ratio Test ("SPRT"). It can be mathematically proven that the SPRT is optimal in the sense that there is no other test that can provide a shorter time-to-detection of a change-point in SER distribution with a smaller false-alarm and missed alarm probability.

The performance of conventional SERD algorithms as well as SPRT algorithms is adversely affected by large dynamic variations in cosmic neutron flux levels at the surface of the earth. These variations are due to solar activity and other cosmic events, which can cause dynamic variations by as much as a factor of six in hourly cosmic neutron flux levels at sea level (and even larger variations at higher altitudes). In addition to short-term fluctuations that are attributable to the "burstiness" of cosmic events, there are also systematic variations over the course of weeks, and an additional 20% long-term variation that is correlated with the well known eleven year sun-spot cycle.

These inherent dynamic variations in soft error likelihood impose a fundamental limit on the sensitivity with which changes in SER can be detected. If there is no way to dynamically adjust the likelihood for soft error events, then the threshold for SERD must be set above the levels attained by the highest daily peaks in cosmic flux. Then, if a change in SER were to occur during the "troughs" in cosmic activity, the SERD algorithm will be insensitive to such changes and will not allow an indication of the onset of mechanisms leading to a hard fault.

A second limitation that impacts both the conventional SERD and a newer SPRT approach is addressing the acceleration of SER due to altitude. There can be as much as a 70% acceleration in cosmic neutron flux between a data center in San Diego, at sea level, and a data center in Denver (due to less atmospheric attenuation of cosmic particles at high altitudes). Again, if a constant-threshold "leaky bucket" algorithm is adjusted so as to not give excessive false alarms for data centers at high altitudes, the algorithm would be undesirably insensitive for catching incipient faults for customers at sea level.

In a widely deployed computer system, the number of service calls and replaced memory modules can be significant. A majority of the replaced memory modules are only due to soft errors (NTF). This represents a huge cost to the computer service provider and results in a significant amount of customer dissatisfaction. Although a significant portion of the NTF memory modules are due to soft errors in today's platforms, the problem of false positive indication is going to get even worse in the future. This is because each generation of memory components has exponentially more "targets" for each cosmic neutron event, and the source voltage continues to drop, lowering the threshold for cosmic-induced soft errors.

What is desired, therefore, is a method for discriminating between soft errors in a memory module in a computing system, and the onset of mechanisms that can lead to hard faults, that makes provision for changes in cosmic neutron flux, but does not generate false positive responses, and does not exhibit insensitivity during troughs in the cosmic neutron flux.

SUMMARY OF THE INVENTION

According to an embodiment of the present invention, a method for use in a computer system provides a dynamic, "self tuning" soft-error-rate-discrimination (SERD) method and apparatus.

According to an embodiment of the present invention, specially designed SRAMs or other circuits are "tuned" in a manner that gives them extreme susceptibility to cosmic neutron events (soft errors), higher than that of the "regular" SRAM components, memory modules or other components in the computer system. One such specially designed SRAM is deployed per server. An interface algorithm continuously sends read/write traffic to the special SRAM to infer the soft error rate (SER), which is directly proportional to cosmic neutron flux. The inferred cosmic neutron flux rate is employed in a Poisson SPRT algorithmic approach that dynamically compensates the soft error discrimination sensitivity in accordance with the instantaneous neutron flux for all of the regular SRAM components in the server.

According to the method of the present invention, NTF rates are diminished for memory components in current computer systems, as well as future systems that include lower supply voltages and smaller feature sizes in integrated circuit memories and modules.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

WRITTEN DESCRIPTION OF AN EMBODIMENT OF THE INVENTION

Figure 1:
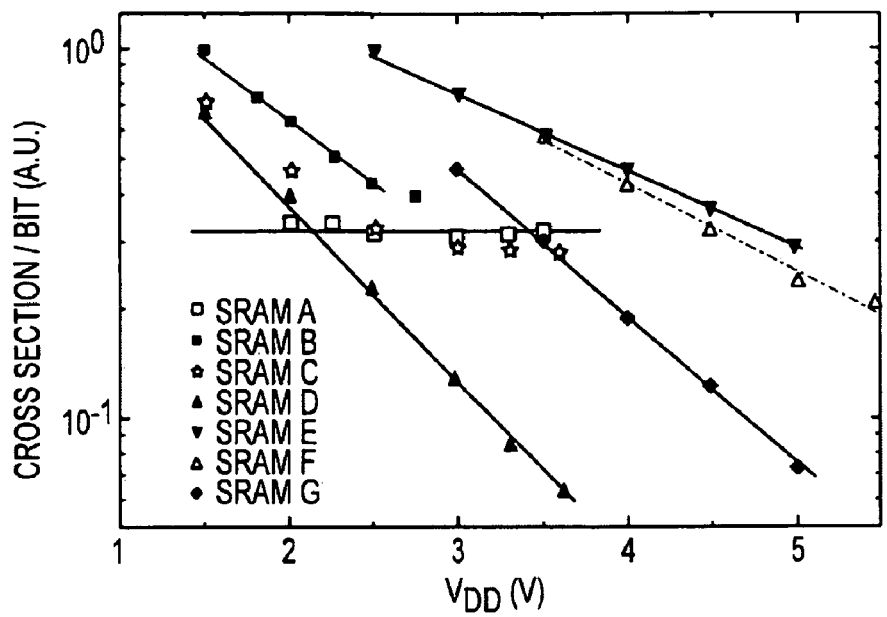
FIG. 1 is a graph showing the probability of neutronic events versus supply voltage in an SRAM according to the prior art.

According to an embodiment of the present invention, a computer system is provided with individual SRAMs (one per monitored computer or computer system) that have been deliberately tuned to maximize the sensitivity to cosmic neutron events. Although the following description refers to special SRAMs that have been tuned for increased sensitivity to cosmic neutron events, any integrated logic circuit or integrated circuit memory device could be similarly tuned.

The sensitivity tuning of the SRAMs is achieved via a bivariate, double-exponential sensitivity enhancement. The cross section (probability) for cosmic neutron events increases exponentially with 1/Voltage, and exponentially with 1/Gate_Length, as is explained in greater detail below. For the high-sensitivity SRAMs, a continuous write/read algorithm is applied thereto to infer instantaneous CE rates; then the CE rate of the ultra-sensitive SRAMs is used to generate a dynamic "Background Compensation Factor" (BCF).

The BCF varies dynamically with the inferred cosmic flux activity. The BCF is used to normalize a mean value of a moving window of CE events for any given SRAM. The method of the present invention is used, in effect, to subtract out a "dynamic background" flux level. The method of the present invention is therefore an improvement of the leaky bucket algorithm, but with the contents of the bucket being continuously normalized by the local cosmic neutron flux. After normalizing for dynamic flux, the remaining residuals form a stationary Poisson process with time. To this a Poisson Sequential Probability Ratio Test (SPRT) is applied, which gives the shortest mathematically possible time to annunciation of a subtle hard-fault mechanism growing into the monitored device, with the lowest mathematically possible probability of false alarms.

The number of correctable events registered for a specified period of time has a Poisson distribution. The intensity of events, denoted as I, is the parameter of the Poisson distribution, $f(x;I)=(I*T)^x/x!*\exp(-I*T)$, where T is a time period and x=0, 1, 2 . . . . It is assumed that when a permanent (or hard) fault occurs, the intensity of correctable events increases noticeably. Therefore, given an event intensity for a new module, denoted as I_new, and an event intensity of a hard-failed module (a module with bad cells resulting in single-bit errors), denoted as I_bad, a sequential detection procedure can be implemented for a change point detection at which the CE intensity transitions from I_new to I_bad. When such a transition is detected, it can be concluded with a certain level of confidence that the module has experienced a hard failure.

A typical choice of the transition point detection is a Repeated Sequential Probability Ratio Test (RSPRT) among others. The Sequential Probability Ratio Test (SPRT) procedure comprises the following steps: (1) specify the actual or hypothesized type of the distribution of sequentially observed data points; (2) specify the desired False Alarm (Type I error) Rate (FAR) value and Missed Alarm (Type II error) Rate (MAR) value; (3) compute the acceptance and rejection threshold values A=log {(1−MAR)/FAR} and B=log {MAR/(1−FAR)}; and (4) as data points become available, compute the updated value of the log likelihood ratio as Z [n]=Z[n−1]+log {f(X[n];I_new)/f(X[n];I_bad)}. The data points here represent the number of correctable events during the time interval between n−1 and n; (5) check if Z[n] crossed one of the thresholds A or B. If Z[n] crossed A then the hypothesis that the current event intensity I_curr is equal to I_bad is accepted. If Z[n] crossed B then the null hypothesis that the current intensity I_curr=I_new is accepted. In both cases the current Z[n] is reset to zero and the procedure is repeated starting with step (4). If the current value B<Z[n]<A, then continue observations; (6) If I_curr=I_bad is repeatedly accepted for a specified period of time, the corresponding module is declared hard-failed and scheduled for replacement or the corresponding memory page is scheduled for retirement.

This procedure assumes that the current intensity of correctable events is fixed at the beginning of each run (repetition) and is equal to either I_new or I_bad. Since there is natural variation of the intensity, as described above, the RSPRT procedure should be modified to remain applicable to the situation considered. The modification is done via introducing the background compensation factor (BCF) into the event intensities to remove variations not associated with hard failures. Accordingly, I_new and I_bad become functions of BCF, i.e. I_new=I_new(BCF) and I_bad=I_bad(BCF). The modified step (4) becomes: As data points become available, compute the updated value of the log likelihood ratio as Z[n]=Z[n−1]+log {f(X[n];I_new(BCF[n]))/f(X[n];I_bad (BCF[n]))}.

The functional relationships I_new(BCF) and I_bad(BCF) are established either empirically or theoretically according to the properties of the high-sensitivity SRAM module.

Figure 2:
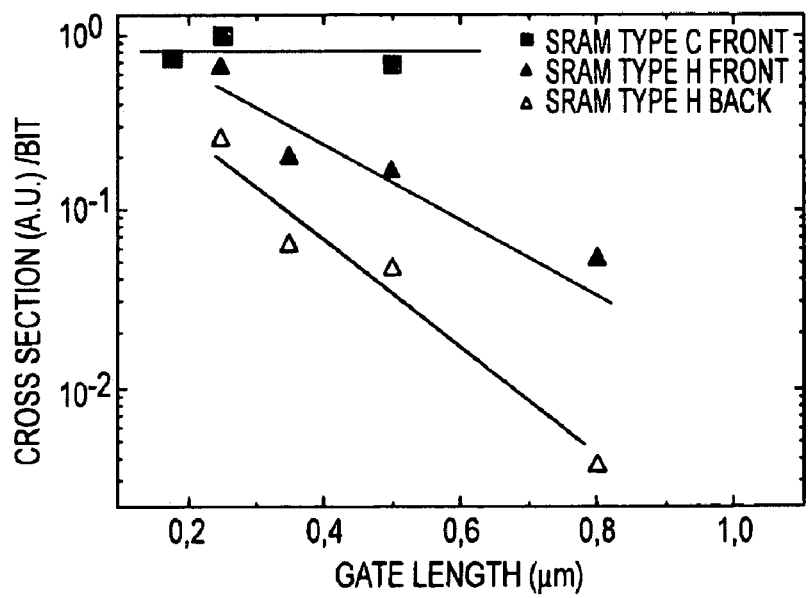
FIG. 2 is a graph showing the probability of neutronic events versus gate length in an SRAM according to the prior art.
Figures 3, 4:
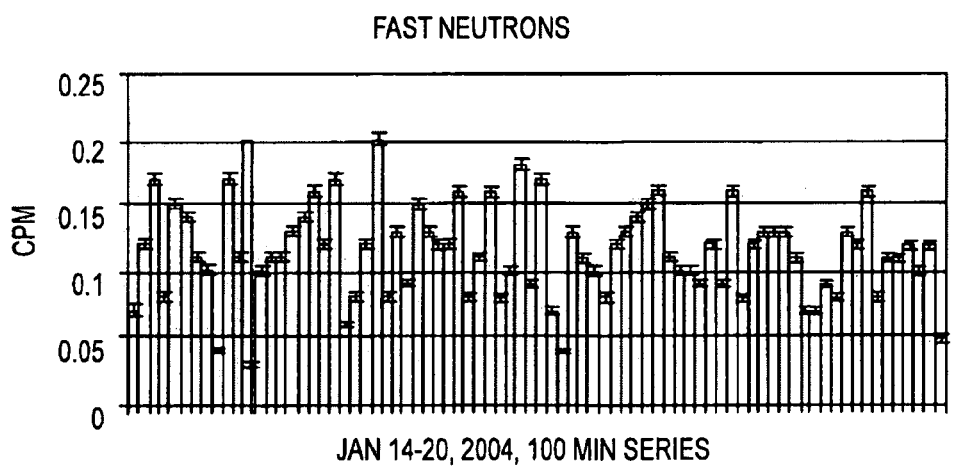
FIG. 3 is a table summarizing the types of SRAMs that were used to generate the data found in FIGS. 1 and 2.
FIG. 4 is a graph showing the changes in neutron flux over the course of a week in January of 2004 according to the prior art.

Referring now to FIG. 1, a graph showing cross section for single-event upsets (SEUs) as a function of SRAM supply voltage is shown. Referring now to FIG. 2, a graph showing the cross section for SEUs as a function of memory-cell feature size is shown. In FIGS. 1 and 2, it is important to note that the cross section for cosmic neutron events goes up exponentially with 1/Voltage, and exponentially with 1/Gate_Length. The types of SRAM modules used to generate the experimental curves in FIGS. 1 and 2 are summarized in the table of FIG. 3. In FIG. 3, "Technology Node" refers generally to milestones in the timeline for integrated circuit development, as is known in the art. More specifically, the term is approximately the smallest feature size printed for new integrated circuits, and corresponds to milestones on the timeline of Moore's law when the number of transistors on a unit chip size will double. "Sensitive Volume" refers to a physical volume of silicon that is susceptible to an upset event if a cosmic ray hits it, and is roughly equal to the gate length cubed. Memory types "C" and "H" refer to "Commercial" (for standard off the shelf memory modules), vs. "Hardened" (which are made as resistant as possible to radiation effects).

In the present invention, the enhanced sensitivity SRAM is chosen to be SRAM Type D with Memory Type H, in order to achieve a bi-variate, double-exponential sensitivity enhancement. While the present SRAM type and memory type is selected as described, other SRAMs can be used, as well as other integrated circuits as described above. A range of operating voltages and gates lengths or feature sizes can be used to provide the increased sensitivity to cosmic neutron events required in the method of the present invention.

If spatial correlations are sufficiently strong over tens of meters, it may be possible to have just one of the special SRAMs in a single server, then use the rate inferred from that SRAM to establish the dynamic threshold for the entire data center. However, it is important to note that the systems in a data center may have different architecture and memory types. Further, some of the systems may be shielded better than the others from neutrons. Typically, components of a server get upgraded with new types of system boards. All of these considerations suggest the desirability of using a special SRAM per system board for establishing the dynamic threshold for each board.

Neutron flux is not constant as required in the prior art method described above. Neutron flux is highly variable in nature both in the short term and over longer periods of time. The method of the present invention works properly even though there are wide swings in the number of cosmic neutrons events over time. Neutron data are illustrated in FIG. 4 over a one week period. The data represent relative neutron fluence measured in CPM ("Counts Per Minute"), which is directly proportional to absolute neutron flux. The data are represented in 100 minute ensemble averages. The raw data granularity is one minute.

The measurements of FIG. 4 show instances of up to a factor of six for variations in neutron flux between measurements taken less than 48 hours apart. This signifies a significant "burstiness" to the cosmic flux rates. However, the present criteria for pulling memory DIMMs from servers in a computer system uses a threshold value that is constant year round, and for any altitudes.

By using a dynamic threshold for Soft Error Rate (SER) discrimination from the incipience of hard faults according to the method of the present invention, it is possible to reduce the incidence of NTF memory components in servers in computer systems.

As can be seen in FIG. 4, there is substantial variability in cosmic neutron flux level. As memory densities continue to climb in the future, making memory components increasingly susceptible to soft error events, a fixed-threshold SERD algorithm will become increasingly unsatisfactory.

Figure 5:
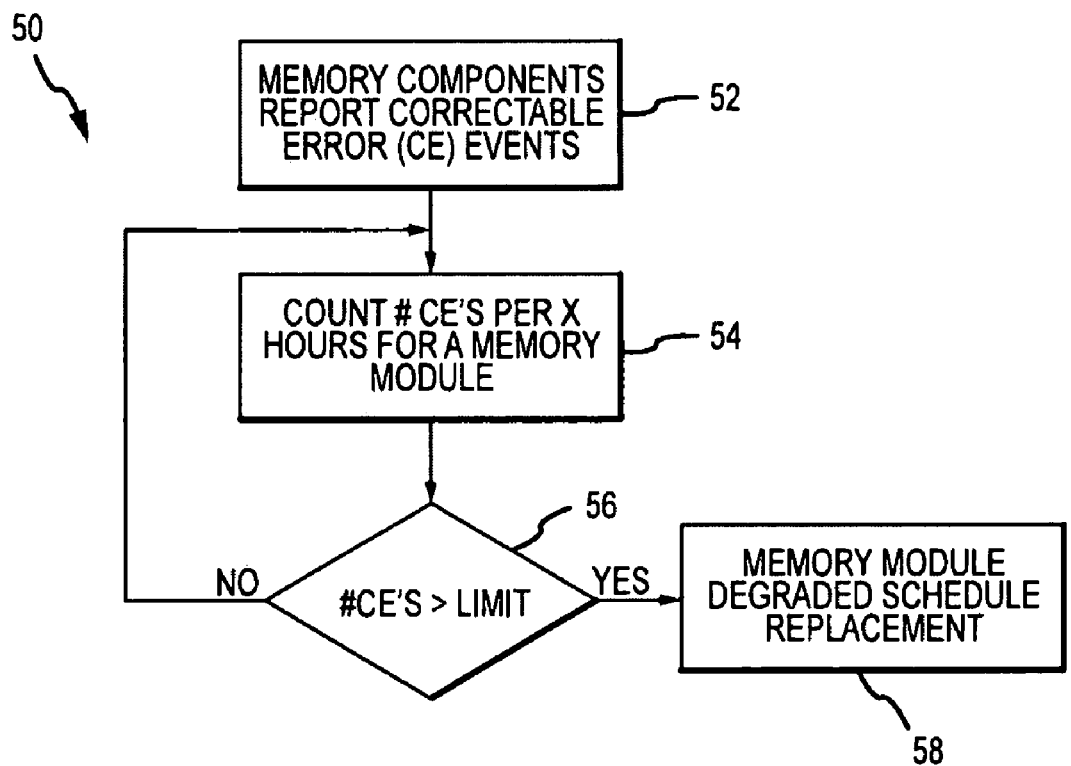
FIG. 5 is a block diagram of a prior art method for soft-error-rate-discrimination in a computer system.

Referring now to FIG. 5, a block diagram of a prior art method 50 to discriminate between soft errors (also called correctable errors, or CEs) and mechanisms leading to hard errors is shown. At step 52 the number of CE events and their time-date stamps is reported. At step 54 the number of CE events occurring in a given pre-specified time window of X hours is tracked, wherein X typically ranges from three to 24 hours. At decision block 56, if the number of CE events occurring in X hours exceeds a pre-specified threshold, at step 58 a degradation flag is raised and the memory module exceeding the threshold is replaced. If the number of CE events does not exceed the threshold, then the process is repeated for a new time window for further monitoring of the memory component.

Figure 6:
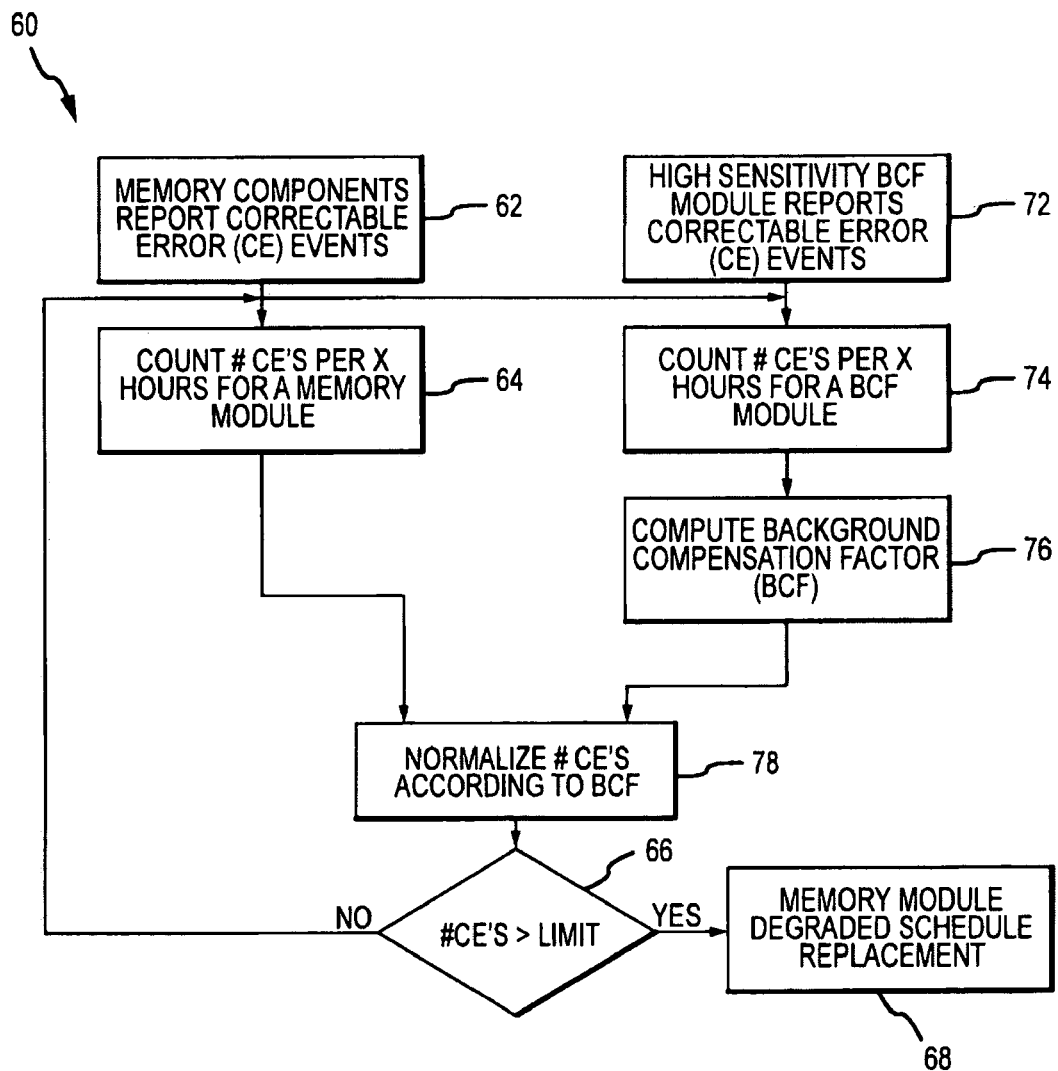
FIG. 6 is a block diagram of a method for soft-error-rate-discrimination according to an embodiment of the present invention.

Referring now to FIG. 6, a block diagram of the method 60 of the present invention is shown. For the present invention, the number of CE events is still tracked for all conventional memory modules in the system. However, as shown in the flowchart of FIG. 6, the CE events coming from a customized memory module, designated in FIG. 6 as a BCF module, is also tracked at step 72. The BCF module is designed with a much higher sensitivity to cosmic neutron events than conventional memory using the approaches outlined in the body of the disclosure. The number of CEs in a specified period of time are counted at step 74. At step 76, a Background Compensation Factor is computed as a function of correctable errors experienced by the sensitive module during a selected time interval. One of the ways to represent BCF is as an actual measured intensity of correctable events for the sensitive module I_sen during the time interval. Then, the intensity of the conventional module, for the RSPRT procedure described above, is normalized using I_sen[n] as I_new(BCF[n])=I_sen[n]/K, where K is a constant determined by the properties of the sensitive unit. For example, if the sensitive unit is one hundred times more sensitive to neutrons than a conventional module, then K=100.

The number of CE events from the BCF module is used to normalize the number of CE events coming from conventional memory modules (i.e. to subtract out a dynamic component that is proportional to cosmic neutron flux). This is done at step 78. After normalization for dynamic cosmic flux, the corrected CE event counts are compared against a threshold, as shown in the flowchart at decision block 66. If the threshold is exceeded a degradation flag is set and the memory component is scheduled to be replaced at step 68. If the threshold is not exceeded, then the number of CEs for the memory component is monitored for a new time window.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. In a computer system, a method for discriminating between soft errors that arise from cosmic neutron events and soft errors that arise from the onset of mechanisms that can lead to hard faults, the method comprising:

tracking the number of soft errors occurring in a memory component of the computer system for a specified time window;

tracking the number of soft errors occurring in a customized memory module for the specified time window, the customized memory module having a sensitivity to cosmic neutron events; and adjusting the number of soft errors occurring in the memory component using the number of soft errors occurring in the customized memory module.

2. The method of claim 1 further comprising comparing the adjusted number of soft errors against a threshold.

3. The method of claim 2 further comprising setting a degradation flag if the threshold is exceeded.

4. The method of claim 1, wherein the customized memory module is a static random access memory (SRAM) module.

5. The method of claim 2 further comprising continuing to track the number of soft errors in the memory component and the customized memory module if the threshold is not exceeded.

6. The method of claim 1, wherein a supply voltage to the customized memory module is at least one of adjusted and adjustable to provide higher sensitivity to cosmic neutron events.

7. The method of claim 1, wherein gates lengths of the customized memory module are selected to provide higher sensitivity to cosmic neutron events.

8. In a computer system, a method for discriminating between soft errors that arise from cosmic events and soft errors that arise from the onset of mechanisms that can lead to hard faults, the method comprising:

counting the number of soft errors occurring in a memory component of the computer system for a specified time window;

counting the number of soft errors occurring in a customized integrated circuit for the specified time window, the customized integrated circuit having a sensitivity to cosmic events;

computing a background compensation factor that is dependent upon the number of soft errors counted for the customized integrated circuit;

adjusting the number of soft errors occurring in the memory component in accordance with the background compensation factor.

9. The method of claim 8 further comprising comparing the adjusted number of soft errors against a threshold.

10. The method of claim 9 further comprising setting a flag if the threshold is exceeded.

11. The method of claim 8, wherein the customized integrated circuit is a static random access memory (SRAM) module.

12. The method of claim 9 further comprising continuing to count the number of soft errors in the memory component and the customized integrated circuit if the threshold is not exceeded.

13. The method of claim 8, wherein a supply voltage to the customized integrated circuit is at least one of adjusted and adjustable to provide higher sensitivity to cosmic neutron events.

14. The method of claim 8, wherein features of the customized integrated circuit are selected to provide higher sensitivity to cosmic neutron events.

15. A system for discriminating between soft errors that arise from cosmic events and soft errors that arise from the onset of mechanisms that can lead to hard faults, the system comprising:

a memory module that has an associated soft error threshold, wherein the soft error threshold is a number of soft errors occurring in a specified time window;

a customized integrated circuit that is sensitive to cosmic events such that the number of soft errors occurring in the customized integrated circuit increases with the increase of cosmic events; and a soft error threshold module that dynamically modifies the soft error threshold for the memory module dependent upon the number of soft errors occurring in the customized integrated circuit.

16. The system of claim 15, wherein the customized integrated circuit is a static random access memory (SRAM) module.

17. The system of claim 15, wherein the memory module, the customized integrated circuit, and the soft error threshold module are part of a single computer server.

18. The system of claim 15, wherein the soft error threshold module increases the soft error threshold for the memory module when the number of soft errors occurring in the customized integrated circuit increases.

19. The system of claim 15, wherein the soft error threshold module modifies the soft error threshold of the memory module by subtracting a compensation factor from the number of soft errors occurring in the memory module, wherein the compensation factor is dependent upon the number of soft errors occurring in the customized integrated circuit.

20. The system of claim 15, wherein the customized integrated circuit is a memory module.

* * * * *